April 16, 1940.    D. B. BAKER ET AL    2,197,290
CONTROL MECHANISM
Filed Sept. 27, 1938
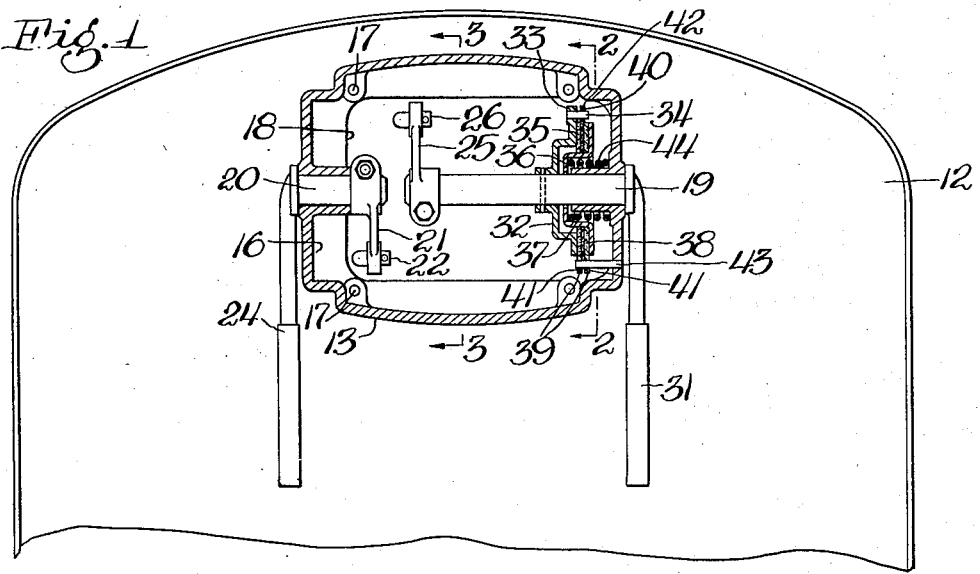
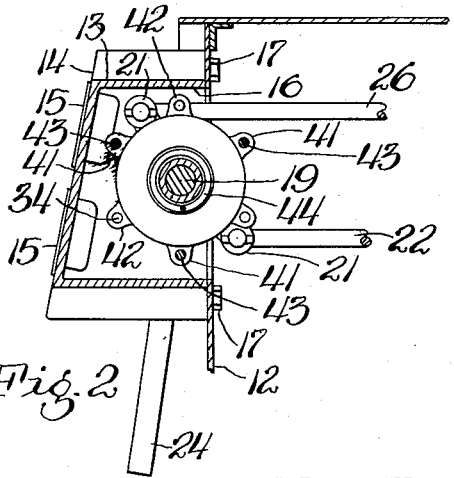
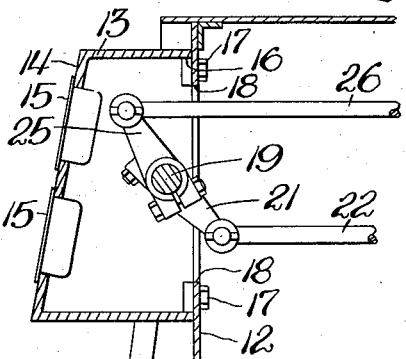
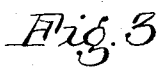
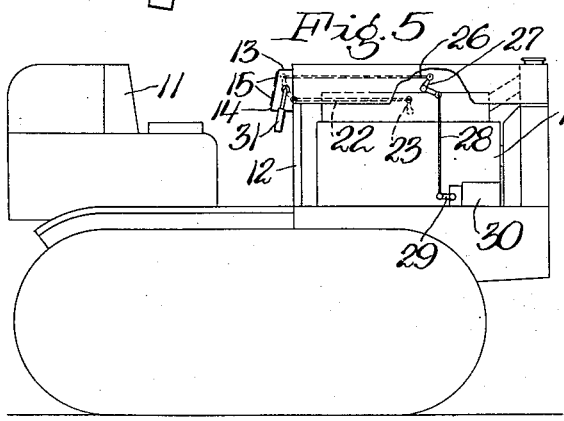
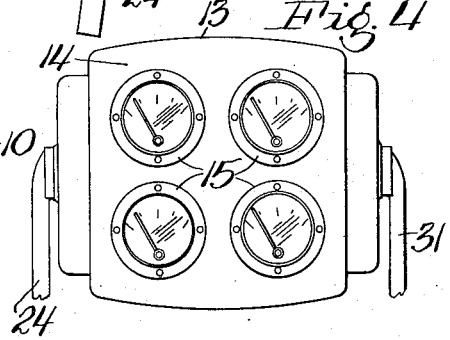
Inventors
D. B. Baker,
C. R. Rogers, W. O. Bechman
By V. F. Lassagne, Atty.

Patented Apr. 16, 1940

2,197,290

UNITED STATES PATENT OFFICE 2,197,290

CONTROL MECHANISM

David B. Baker, Riverside, Clifford R. Rogers, Oak Park, and William O. Bechman, Chicago, Ill., assignors to International Harvester Company, a corporation of New Jersey Application September 27, 1938, Serial No. 231,952

3 Claims. (Cl. 180—77)

This invention relates to control means for a controllable device and more particularly to an improved unitary supporting means for mounting indicating instruments and control levers interconnected with the control means and adapted to control one or more devices associated with an engine in a vehicle.

The improved construction is particularly adapted for use in a tractor wherein the source of power utilized is a governor controlled Diesel engine. In this type of engine, the governor takes the place of the ordinary throttle mechanism used in conjunction with the ordinary gasoline engine. It is desirable, of course, that control means be provided for regulating the governor to control the speed of the engine and it is additionally important that this control means be located within easy reach of an operator situated on an operator's station on the tractor. Most tractors of the type utilizing Diesel engines are of a comparatively large size and include the engine located at the forward part of the main body of the tractor and an operator's station at the rear part of the main body. The engine and the operator's station are separated by a transverse dash panel located closely adjacent the rear end of the engine and directly in front of the operator's station. Convenience, of course, dictates that the control means for regulating the governor be mounted on this dash panel within reach of the operator's station. Prior constructions making provision for the mounting of this control means are characterized by certain disadvantages involving difficulty in operation and consequent complications in manufacture in an attempt to overcome said difficulties. Among such difficulties was that encountered in the endeavor to provide a control means including a lever which could be maintained in any one of various operating positions without being dislodged therefrom by vibration caused by operation of the tractor. Other difficulties resulted from the lack of appropriate supporting means for the control levers and the indicating instruments, the same being disposed at various positions on the dash panel, militating against accessibility and visibility to the operator.

The principal object of the present invention is to provide an improved control means in which a control lever or the like may be maintained in any one of various positions.

An important object is to provide a simple and desirable control means including friction means for accomplishing the above named object.

Another object is to provide a mounting means for the control means which comprises a unitary housing serving to support the control means and also to carry a plurality of indicating instruments, such as gauges and the like.

Another object is to group the instruments and the control levers in a convenient manner for improving the accessibility and the visibility thereof.

Briefly and specifically, these and other desirable objects are achieved in one preferred embodiment of the invention as will be hereinafter set out. A hollow housing, preferably formed as a casting, is mounted on the operator's station side of the transverse dash panel, the housing including a substantially vertical integral wall which serves to support a plurality of indicating instruments in positions facing the operator's station. The control means for controlling various parts of the engine are carried by this casting and each includes a transverse rock-shaft journaled in the casting and including a portion extending outside thereof. A control lever is mounted on this outer portion of the shaft within easy reach of the operator on the operator's station and in one of the control means there is included means for maintaining the rock-shaft in any one of a plurality of angular positions, this means being enclosed by the casting housing and including a pair of friction plates spring pressed together. The other control means in the present instance is not provided with such a friction means. Both control means are connected to particular parts of the engine adapted to be controlled or regulated.

A more complete understanding of the objects and advantages of the invention may be had from the following detailed description taken in conjunction with the accompanying sheet of drawings, in which:

Figure 1 is a vertical, transverse sectional view taken through the supporting housing and illustrating the control means and the friction means;

Figure 2 is a vertical longitudinal view of the same taken substantially along the line 2—2 of Figure 1;

Figure 3 is a similar sectional view taken along the line 3—3 of Figure 1;

Figure 4 is a face view of the improved housing showing the mounting of the control levers and the plurality of indicating instruments; and, Figure 5 is a side elevational view showing the incorporation of the improved construction in a tractor of the track-laying type.

The track type tractor shown diagrammatically in Figure 5 comprises generally a main frame at the forward end of which is located an internal combustion engine 10, the engine in the present instance being of the Diesel type. It will be understood that a slight alteration of the means to be hereinafter described will suffice to adapt said means to any other type of engine having a device or devices to be controlled. An operator's station including an operator's seat 11 is mounted at the rear of the frame, being separated from the engine by a transverse dash panel 12. The engine 10 is disposed behind a usual radiator and covered by a hood construction of any suitable type.

The control means comprises a support or housing 13 preferably in the form of a hollow casting having a substantially vertical transverse wall 14 facing the operator's seat 11. This wall is preferably inclined to the vertical and is provided with a plurality of openings in which are carried a plurality of indicating instruments 15 in the form of heat, oil, ampere gauges or the like, as best shown in Figure 4. Because of the inclination of the wall 14 and the size of the housing 13, these gauges are conveniently grouped and clearly visible to an operator on the operator's seat.

The housing 13 is open at one side as at 16 and is rigidly secured by a plurality of bolts 17 over an opening 18 in the transverse dash panel 12. In addition to the instruments or gauges 15, the housing also carries a pair of transverse rock-shafts 19 and 20 journaled therein. The inner portion of the rock-shaft 20 is disposed within and enclosed by the housing and has rigidly secured thereto an arm 21 which is connected by a link 22 extending through the openings 16 and 18 in the housing and dash panel, respectively, to an arm 23 associated with the engine 10. The position of the arm 23 is shown diagrammatically in Figure 5, the showing therein being deemed sufficient for the purpose of the present invention. The arm 23 may be mounted on a rock-shaft or otherwise connected to any device on the engine which it is desirable to control, such as the mechanism for regulating compression release valves or the like. A control lever 24 is rigidly secured to the shaft 20 outside the housing 15 and is within easy reach of the operator on the seat 11. The convenient location of the lever 24 and the gauges or instruments 15 is best shown in Figure 4.

The transverse rock-shaft 19 is journaled in the housing 13 and is disposed preferably substantially coaxial with respect to the shaft 20, the inner end thereof terminating within and being enclosed by the housing. An arm 25 rigidly carried on said inner end is connected by a link 26, extending through the openings in the housing and the dash panel, to any suitable form of mechanism such as a bell crank 27 which is in turn connected by a link 28 to an arm 29 adapted to regulate or control a suitable device on the engine such as a speed regulator governor 30. It will be understood, of course, that either of the rock-shafts 19 or 20 may be suitably connected to other types of controllable devices. A control lever 31 is rigidly carried by the shaft 19 outside the housing 13 and like the control lever 24 is within easy reach of the operator and is conveniently located on the housing with particular reference to accessibility for convenience in operating same.

The shaft 19 at its portion within and enclosed by the housing 13 rigidly carries thereon a flanged member 32 having a plurality of ears 33, each carrying a pin 34. The member 32 has a flat radial face 35. A circular cap member or element 36 loosely fits the shaft 19 between an end wall of the housing and the member 32 and is formed with a circular pocket 37 and a radial face 38. A plurality of friction elements or disks 39 and 40 are disposed coaxially with respect to the parts 32 and 36 and fit between the faces 35 and 38, respectively, thereon. These plates are preferably formed of flexible material such as used in clutch facings or the like. In the present instance, there are two disks 39 and one disk 40, the former being provided with a plurality of ears 41 and the latter with a plurality of ears 42. Each ear 42 is formed with an opening which fits over a respective pin 34 carried by the member 32. Each of the ears 41 on the disks 42 is provided with an opening which fits over a pin 43 engaging or rigidly carried by a portion of the housing 13. A coil spring 44 surrounding the shaft 19 is disposed between an end wall of the housing and the pocket 37 in the member 36. This spring serves to move the part 36 toward the part 32, thus resiliently pressing the friction disks together.

It will be seen that the disk 40 engages or is connected to the member 32 which is in turn rigidly carried by the rock-shaft 19. The friction disks 39 are connected to or engage the housing 13. The member 32 and the disk 40 are, therefore, movable with respect to the disks 39. Movement of the lever 31 will rock the shaft 19, and because of the inter-engagement of the friction disks, said lever will remain in any position in which it may be set. Vibration caused by operation of the tractor will not dislodge the lever from its position, and thus a set position of the governor will not be altered. The control means at the opposite side of the housing, comprising the rock-shaft 20 and the lever 24, may be similarly provided with friction means, the same being omitted in the present instance since operation of the device controlled by this means is more or less positive; that is, it may be set in either one of two positions.

From the foregoing description, it will be seen that an improved control means has been provided for controlling or regulating certain devices in conjunction with an internal combustion engine and that there has also been provided suitable supporting means for the same, said supporting means serving also to carry a plurality of indicating instruments or gauges. The control levers forming a part of the control means are located within easy reach of an operator on the operator's seat and in close proximity to the aforesaid indicating instruments, the component parts of the assembly being conveniently grouped with a view toward enhancing accessibility and visibility of the same.

While only a preferred embodiment of the invention has been illustrated and described, and particular objects and features in conjunction therewith set out, it will be appreciated that various alterations in the construction may be made without sacrificing any of these objects and features and without departing from the spirit and scope of the invention as defined in the appended claims.

What is claimed is:

1. A vehicle having a body and including an engine at one end thereof, said body including a transverse dash panel at one end of the engine and having an opening therein, the combination with the panel of a unitary instrument and control lever-supporting housing structure carried by the panel over the opening, a transverse rock-shaft journaled in the housing and extending at one side thereof, an operating lever on the rock-shaft outside the housing, means connecting the rock-shaft to a part of the engine adapted to be controlled, said means including an arm carried by the rock-shaft within the housing and movable through the opening through a vertical longitudinal plane, said means also including linkage connected to the arm and extending through the opening to the aforesaid engine part, and a plurality of substantially circular friction elements arranged on the shaft within the housing, the elements being alternately secured respectively to the shaft and to the housing.

2. A friction means for a control shaft, comprising a support, a rock-shaft journaled in the support, a circular member carried rigidly on the shaft, a second circular member slidable on the shaft and spaced from the first member, said second member including a central cylindrical cupped portion extending axially toward the first member and an annular radial portion spaced from the first member, a coil spring surrounding the shaft within the cupped portion of the second member and abutting the support, and a plurality of circular friction rings arranged side-by-side between the members and encircling the cupped portion of the second member, said rings being alternately secured respectively to the first member and to the support.

3. A friction means for a control shaft, comprising a support, a rock-shaft journaled in the support, a circular member on the shaft including a central hub portion secured to the shaft, a larger, cylindrical recess and a larger, contiguous radial flange portion, a second circular member slidable on the shaft and including a central, hollow cylindrical portion surrounding the shaft and contained generally in the recess of the first member, said second member further having a larger radial flange portion similar to and normally spaced from the radial flange on the first member, a plurality of friction rings interposed between the members and encircling a portion of the cylindrical portion of the second member, said rings being alternately secured respectively to the first and second members, and a coil spring generally contained in the second member cylindrical portion and abutting the support.

DAVID B. BAKER.
CLIFFORD R. ROGERS.
WILLIAM O. BECHMAN.